United States Patent
Kamamoto et al.

(10) Patent No.: US 9,243,667 B2
(45) Date of Patent: Jan. 26, 2016

(54) TAPERED ROLLER BEARING AND POWER TRANSMISSION DEVICE USING TAPERED ROLLER BEARING

(71) Applicant: JTEKT CORPORATION, Osaka-shi, Osaka (JP)

(72) Inventors: Shigeo Kamamoto, Kashiwara (JP); Hiroki Matsuyama, Nara (JP); Junji Murata, Nishiba (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 14/305,353

(22) Filed: Jun. 16, 2014

(65) Prior Publication Data

US 2014/0369635 A1    Dec. 18, 2014

(30) Foreign Application Priority Data

Jun. 17, 2013 (JP) ................. 2013-126401
Jun. 17, 2013 (JP) ................. 2013-126441
Jun. 17, 2013 (JP) ................. 2013-126442

(51) Int. Cl.
*F16C 37/00* (2006.01)
*F16C 33/66* (2006.01)
(Continued)

(52) U.S. Cl.
CPC ............ *F16C 37/007* (2013.01); *F16C 19/364* (2013.01); *F16C 33/6651* (2013.01); *F16C 33/6681* (2013.01); *F16C 33/36* (2013.01);
(Continued)

(58) Field of Classification Search
CPC .. F16C 37/007; F16C 19/364; F16C 33/6681; F16C 33/4676; F16C 33/586; F16C 33/36; F16C 33/405; F16C 33/583; F16C 33/6651; F16C 33/6685; F16C 41/005

USPC ......... 384/467, 464–465, 471, 475, 571–572, 384/621, 565
See application file for complete search history.

(56) References Cited

U.S. PATENT DOCUMENTS 2,653,062 A * 9/1953 Sperisen ................. 384/302
2,945,730 A * 7/1960 Murray et al. ............ 384/480
(Continued)

FOREIGN PATENT DOCUMENTS

EP   0 654 613 A1   5/1995
JP   06241235 A *   8/1994  ............ F16C 33/66
(Continued)

OTHER PUBLICATIONS

Oct. 24, 2014 Extended Search Report issued in European Application No. 14172514.3.

*Primary Examiner* — Marcus Charles
(74) *Attorney, Agent, or Firm* — Oliff PLC

(57) ABSTRACT

A tapered roller bearing includes: an inner ring; an outer ring provided on an outer peripheral surface of the inner ring via an annular space so as to be disposed on the same center line as the inner ring; a plurality of tapered rollers rollably disposed in the annular space; and a cage retaining the plurality of tapered rollers. The tapered roller bearing is configured such that: liquid lubricant flows through the annular space; and among the inner ring, the outer ring, the tapered rollers, and the cage, at least one rotating component configured to rotate at the time of bearing rotation is provided with a vaporization promotion mechanism configured to decrease a pressure of the lubricant at the time of bearing rotation so that the pressure of the lubricant reaches a saturation vapor pressure at which the lubricant changes from a liquid phase to a vapor phase.

15 Claims, 14 Drawing Sheets

(51) Int. Cl.
*F16C 19/36* (2006.01)
*F16C 33/36* (2006.01)
*F16C 33/46* (2006.01)
*F16C 33/58* (2006.01)

(52) U.S. Cl.
CPC ......... *F16C33/4605* (2013.01); *F16C 33/4676* (2013.01); *F16C 33/586* (2013.01)

(56) References Cited

U.S. PATENT DOCUMENTS

| | | | | |
|---|---|---|---|---|
| 3,811,743 | A * | 5/1974 | Wren | 384/475 |
| 4,379,599 | A * | 4/1983 | Sundqvist | 384/464 |
| 4,400,040 | A * | 8/1983 | Toth et al. | 384/465 |
| 5,058,262 | A * | 10/1991 | Brockmuller et al. | 29/725 |
| 5,136,777 | A * | 8/1992 | Brockmuller et al. | 29/725 |
| 6,039,322 | A * | 3/2000 | Stadler | 277/551 |
| 7,144,162 | B2 * | 12/2006 | Kumar et al. | 384/470 |
| 7,478,479 | B2 * | 1/2009 | Ohno | 29/898.051 |
| 7,771,122 | B2 * | 8/2010 | Nagai | 384/470 |
| 2006/0193545 | A1 * | 8/2006 | Bridges et al. | 384/470 |
| 2013/0087413 | A1 * | 4/2013 | Carter et al. | 184/6.11 |

FOREIGN PATENT DOCUMENTS

| | | | |
|---|---|---|---|
| JP | H07-259864 A | 10/1995 | |
| JP | 09032859 A * | 2/1997 | ............. F16C 19/34 |
| JP | 2002242943 A * | 8/2002 | ............. F16C 33/66 |
| JP | 2006258203 A * | 9/2006 | ............. F16C 33/58 |
| JP | 2006-316846 A | 11/2006 | |
| JP | A-2010-91053 | 4/2010 | |
| WO | 2013/042703 A1 | 3/2013 | |

* cited by examiner

TAPERED ROLLER BEARING AND POWER TRANSMISSION DEVICE USING TAPERED ROLLER BEARING

INCORPORATION BY REFERENCE

The disclosure of Japanese Patent Application No. 2013-126401 and 2013-126441 and 2013-126442 filed on Jun. 17, 2013 including the specification, drawings and abstract is incorporated herein by reference in its entirety.

BACKGROUND OF THE INVENTION

1. Field of the Invention

The present invention relates to a tapered roller bearing and a power transmission device using the tapered roller bearing.

2. Description of Related Art

A tapered roller bearing is an excellent rolling bearing having a large load capacity and a high rigidity. However, the tapered roller bearing includes a sliding portion (e.g., a sliding portion between a large end face of a tapered roller and a guideway of a cone back face rib portion of an inner ring) due to sliding contact, and in consideration of occurrences of torque loss and burning due to slide friction of the sliding portion, the tapered roller bearing has limitations in terms of use as a rolling bearing for high-speed rotation. Further, for example, as described in Japanese Patent Application Publication No. 2010-91053 (JP 2010-91053 A), there is such a power transmission device using a tapered roller bearing that a cooling member made from metal having a good heat dissipation property is disposed between a lubricant-inlet-side end part of an outer ring of the tapered roller bearing and a support member for supporting the outer ring. When lubricant flows into the tapered roller bearing from an inlet, the lubricant passes through the cooling member so as to be cooled off.

SUMMARY OF THE INVENTION

In a tapered roller bearing device described in JP 2010-91053 A, it is possible to cool off the lubricant by the cooling member. However, the cooling member should be made from metal having a good heat dissipation property, and assembled between the end part of the outer ring and the support member for supporting the outer ring. Because of this, the number of components and the number of man-hours for assembly are increased.

The present invention provides a tapered roller bearing that is able to cool off lubricant without increasing the number of components and the number of man-hours for assembly, and a power transmission device using the tapered roller bearing.

A tapered roller bearing according to an aspect of the present invention includes: an inner ring; an outer ring provided on an outer peripheral surface of the inner ring via an annular space so as to be disposed on the same center line as the inner ring; a plurality of tapered rollers rollably disposed in the annular space; and a cage retaining the plurality of tapered rollers. The tapered roller bearing is configured such that: liquid lubricant flows through the annular space; and among the inner ring, the outer ring, the tapered rollers, and the cage, at least one rotating component configured to rotate at the time of bearing rotation is provided with a vaporization promotion mechanism configured to decrease a pressure of the lubricant at the time of bearing rotation so that the pressure of the lubricant reaches a saturation vapor pressure at which the lubricant changes from a liquid phase to a vapor phase.

According to the above aspect, the liquid lubricant flows through the annular space between the inner ring and the outer ring at the time of bearing rotation. At this time, the pressure of the lubricant is decreased by the vaporization promotion mechanism provided in the rotating component among bearing components, so that the pressure of the lubricant reaches the saturation vapor pressure at which the lubricant changes from the liquid phase to the vapor phase, thereby causing vapor cavitation. Accordingly, the lubricant is cooled off by evaporation heat of the lubricant that has changed from the liquid phase to the vapor phase. As such, without increasing the number of components and the number of man-hours for assembly, it is possible to cool off the lubricant by the vaporization promotion mechanism provided in the rotating component among the bearing components. As a result, it is possible to provide the tapered roller bearing suitable as a rolling bearing for high-speed rotation.

In the above aspect, the vaporization promotion mechanism may be constituted by roller vaporization promotion portions formed in the tapered rollers.

According to the above configuration, it is possible to easily constitute the vaporization promotion mechanism by the roller vaporization promotion portions formed in the tapered rollers.

In the above configuration, the roller vaporization promotion portions may be each formed from a plurality of grooves extending axially and formed in a noncontact region of an outer peripheral surface of each of the tapered rollers, the noncontact region being a region outside an effective rolling region of the outer peripheral surface of the each of the tapered rollers.

According to the above configuration, the plurality of grooves extending axially is formed in the noncontact region, which is a region outside the effective rolling region of the outer peripheral surface of the tapered roller, thereby constituting the roller vaporization promotion portion. This makes it possible to restrain an adverse effect to a rolling performance of the tapered roller.

Further, in the above aspect, the vaporization promotion mechanism may be provided in the cage.

According to the above configuration, the liquid lubricant flows through the annular space between the inner ring and the outer ring at the time of bearing rotation. At this time, the pressure of part of the lubricant reaches the saturation vapor pressure at which the lubricant changes from the liquid phase to the vapor phase, due to the vaporization promotion mechanism provided in the cage, thereby causing cavitation in the lubricant. Accordingly, the lubricant is cooled off by evaporation heat of the lubricant that has changed from the liquid phase to the vapor phase. As such, without increasing the number of components and the number of man-hours for assembly, it is possible to cool off the lubricant by the vaporization promotion mechanism provided in the cage. As a result, it is possible to provide the tapered roller bearing suitable as a rolling bearing for high-speed rotation.

In the above configuration, a rotation number at the time of bearing rotation may be 1000 rpm or more.

According to the above configuration, when the rotation number at the time of bearing rotation is 1000 rpm or more, the pressure of the lubricant easily reaches the saturation vapor pressure at which the lubricant changes from the liquid phase to the vapor phase, due to the vaporization promotion mechanism provided in the cage, thereby increasing a cooling effect of the lubricant. Further, when the rotation number at the time of bearing rotation is 1000 rpm or more, it is also possible to obtain an effect for torque reduction.

In the above configuration, the cage may include an annular portion, bar portions extending axially from the annular portion, and pockets constituted by the annular portion and the bar portions; each of the bar portions may include a bore-side extending portion extending inwardly in a radial direction, and an outside extending portion extending outwardly in the radial direction; a rear wall surface of the bar portion including the bore-side extending portion and the outside extending portion, in terms of a rotation direction of the cage, may be formed generally perpendicularly to the rotation direction; and the vaporization promotion mechanism provided in the cage may be constituted by the rear wall surface.

According to the above configuration, at the time of bearing rotation, a region where low-pressure parts are caused is increased behind the rear wall surface, in the rotation direction of the cage, of the bar portion including the bore-side extending portion and the outside extending portion, in comparison with a structure in which a bar portion does not include a bore-side extending portion and an outside extending portion. This makes it possible to promote an occurrence of cavitation behind the rear wall surface of the bar portion of the cage. This consequently makes it possible to increase a cooling effect of the lubricant.

In the above configuration, a bore surface of the bore-side extending portion may be provided close to an inner-ring raceway surface of the outer peripheral surface of the inner ring, so as to form a bore-side gap portion between the bore surface of the bore-side extending portion and the outer peripheral surface of the inner ring; an outside surface of the outside extending portion may be provided close to an outer-ring raceway surface of an inner peripheral surface of the outer ring, so as to form an outside gap portion between the outside surface of the outside extending portion and the inner peripheral surface of the outer ring; and the vaporization promotion mechanism provided in the cage may be constituted by a combination of the bore-side gap portion, the outside gap portion, and the rear wall surface including the bore-side extending portion and the outside extending portion of the bar portion.

According to the above configuration, when the bore-side gap portion and the outside gap portion are provided, the lubricant is hard to flow into the rear wall surface of the bar portion. Hereby, the lubricant around the rear wall surface of the bar portion is easy to be reduced along with rotation, so that the pressure of the lubricant is easy to be decreased. Accordingly, it is possible to further promote the occurrence of cavitation behind the rear wall surfaces of the bar portions of the cage, thereby further increasing the cooling effect. Further, an amount of the lubricant entering into the bearing is reduced, which causes a large effect for torque reduction.

In the above configuration, a recessed portion or a projection portion extending axially may be formed on a peripheral surface of at least one of the bore-side extending portion and the outside extending portion of the bar portion of the cage.

According to the above configuration, the recessed portion or the projection portion extending axially is formed on at least one extending portion out of the bore-side and outside extending portions of the bar portion of the cage. Hereby, cavitation is caused in the lubricant even in the recessed portion or the projection portion, thereby making it possible to cool off the lubricant.

In the above configuration, a recessed portion or a projection portion extending axially may be formed in the annular portion of the cage.

According to the above configuration, when the recessed portion or the projection portion extending axially is formed in the annular portion of the cage, cavitation is caused in the lubricant even in the recessed portion or the projection portion, thereby making it possible to cool off the lubricant.

Further, in the above aspect, the vaporization promotion mechanism may be provided in a rotation-side bearing ring configured to rotate at the time of bearing rotation, the rotation-side bearing ring being either one bearing ring out of the inner ring and the outer ring.

According to the above configuration, the liquid lubricant flows through the annular space between the inner ring and the outer ring at the time of bearing rotation. At this time, due to the vaporization promotion mechanism provided in that rotation-side bearing ring configured to rotate at the time of bearing rotation which is either one bearing ring out of the inner ring and the outer ring, the pressure of part of the lubricant reaches the saturation vapor pressure at which the lubricant changes from the liquid phase to the vapor phase, thereby causing cavitation in the lubricant. Then, the lubricant and the rotating component are cooled off by evaporation heat of the lubricant that has changed from the liquid phase to the vapor phase. As such, without increasing the number of components and the number of man-hours for assembly, it is possible to cool off the lubricant by the vaporization promotion mechanism provided in the rotating component configured to rotate at the time of bearing rotation. As a result, it is possible to provide the tapered roller bearing suitable as a rolling bearing for high-speed rotation.

In the above configuration, a rotation number at the time of bearing rotation may be 1000 rpm or more.

According to the above configuration, when the rotation number at the time of bearing rotation is 1000 rpm or more, the pressure of the lubricant easily reaches the saturation vapor pressure at which the lubricant changes from the liquid phase to the vapor phase, due to the vaporization promotion mechanism provided in the bearing ring, thereby increasing the cooling effect of the lubricant. Further, when the rotation number at the time of bearing rotation is 1000 rpm or more, it is also possible to obtain an effect for torque reduction.

In the above configuration, the vaporization promotion mechanism provided in the bearing ring may be constituted by an axial recessed portion or projection portion formed in a rib portion of the rotation-side bearing ring.

According to the above configuration, it is possible to easily constitute the vaporization promotion mechanism provided in the bearing ring by forming the axial recessed portion or projection portion in the rib portion of the rotation-side bearing ring. Further, when the vaporization promotion mechanism provided in the bearing ring is constituted by forming the axial recessed portion or projection portion in the rib portion of the rotation-side bearing ring, it is possible to promote an occurrence of cavitation in the lubricant, thereby making it possible to increase the cooling effect of the lubricant. Further, when the axial recessed portion or projection portion is formed in the rib portion of the rotation-side bearing ring, a surface area of the rib portion of the rotation-side bearing ring is increased, thereby making it possible to increase a heat dissipation property just by that much.

In the above configuration, a temperature of the lubricant may be at least a minimum temperature within a presumed temperature range of the lubricant at the time of bearing rotation.

According to the above configuration, the temperature of the lubricant is at least the minimum temperature within the presumed temperature range of the lubricant at the time of bearing rotation. Accordingly, the pressure of the lubricant easily reaches the saturation vapor pressure at which the lubricant changes from the liquid phase to the vapor phase, due to the vaporization promotion mechanism provided in the rotating component among the bearing components, thereby making it possible to successfully cool off the lubricant and the rotating member. That is, in a case where the temperature of the lubricant is lower than the minimum temperature within the presumed temperature range of the lubricant at the time of bearing rotation, the pressure of the lubricant may not reach the saturation vapor pressure at which the lubricant changes from the liquid phase to the vapor phase. In this case, it is assumed that the cooling effect of the lubricant cannot be expected.

Further, a power transmission device may use the tapered roller bearing of the above aspect as a tapered roller bearing for rotatably supporting a rotating shaft inside the power transmission device.

According to the above configuration, with the use of the tapered roller bearing of the above aspect, it is possible to cool off the lubricant without increasing the number of components and the number of man-hours for assembly.

According to the aspect of the present invention, it is possible to cool off the lubricant by the vaporization promotion mechanism provided in at least one of rotating components among bearing components. As a result, it is possible to provide a tapered roller bearing suitable as a rolling bearing for high-speed rotation.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

A mode for carrying out the invention will be described according to embodiments.

Figure 1:
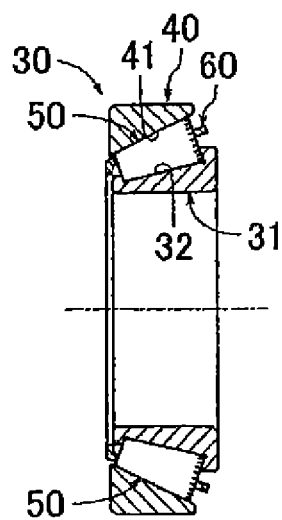
FIG. 1 is an axial sectional view illustrating a tapered roller bearing according to Embodiments 1 to 3 of the present invention.
Figure 2:
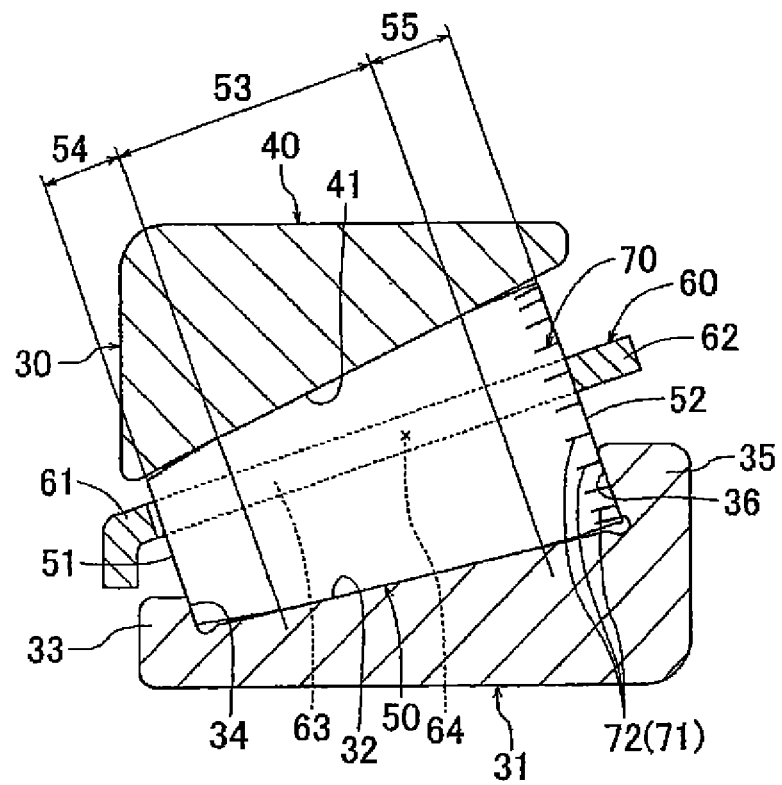
FIG. 2 is an axial sectional view illustrating a relationship between an inner ring, an outer ring, a tapered roller, and a cage in an enlarged manner, according to Embodiment 1.

Embodiment 1 of the present invention is described with reference to FIGS. 1 to 4. As illustrated in FIG. 1, a tapered roller bearing 30 includes an inner ring 31, an outer ring 40, a plurality of tapered rollers 50, and a cage 60. As illustrated in FIG. 2, the inner ring 31 is formed in a tubular shape having a central hole, and an inner-ring raceway surface 32 having a tapered shaft shape of which a diameter is gradually increased from one end toward the other end is formed on an outer peripheral surface of the inner ring 31. Further, on an outer peripheral surface of one end of the inner ring 31 (a small-diameter side of the inner-ring raceway surface 32), a cone front face rib portion 33 having a guideway 34 that guides a small end face 51 of the tapered roller 50 is formed, and on an outer peripheral surface of the other end (a large-diameter side of the inner-ring raceway surface 32), a cone back face rib portion 35 having a guideway 36 that guides a large end face 52 of the tapered roller 50 is formed.

As illustrated in FIG. 2, the outer ring 40 is provided on the outer peripheral surface of the inner ring 31 via an annular space so that the outer ring 40 is disposed on the same center line as the inner ring 31 to form a tubular shape, and an outer-ring raceway surface 41 having a tapered hole shape of which a diameter is gradually increased from one end toward the other end is formed on an inner peripheral surface of the outer ring 40. In the annular space between the inner-ring raceway surface 32 of the inner ring 31 and the outer-ring raceway surface 41 of the outer ring 40, a plurality of tapered rollers 50 is rollably disposed in a state where the plurality of tapered rollers 50 is retained by the cage 60.

As illustrated in FIG. 2, the cage 60 includes: a small-diameter annular portion 61 and a large-diameter annular portion 62 axially separated from each other at a predetermined interval; and bar portions 63 connecting the annular portions 61, 62. Pockets 64 retaining the tapered rollers 50 are formed in parts surrounded by the annular portions 61, 62 and the bar portions 63. The tapered roller bearing 30 is configured such that liquid lubricant flows through the annular space between the inner ring 31 and the outer ring 40. Further, a temperature of the lubricant in the tapered roller bearing 30 is at least a minimum temperature within a presumed temperature range of the lubricant at the time of bearing rotation. For example, a presumed temperature of the lubricant used for a power transmission device is 40° C. to 160° C. Thus, the temperature of the lubricant is 40° C. or more. Further, in Embodiment 1, a rotation number of the tapered roller bearing 30 at the time of bearing rotation is 1000 rpm or more.

Figure 3:
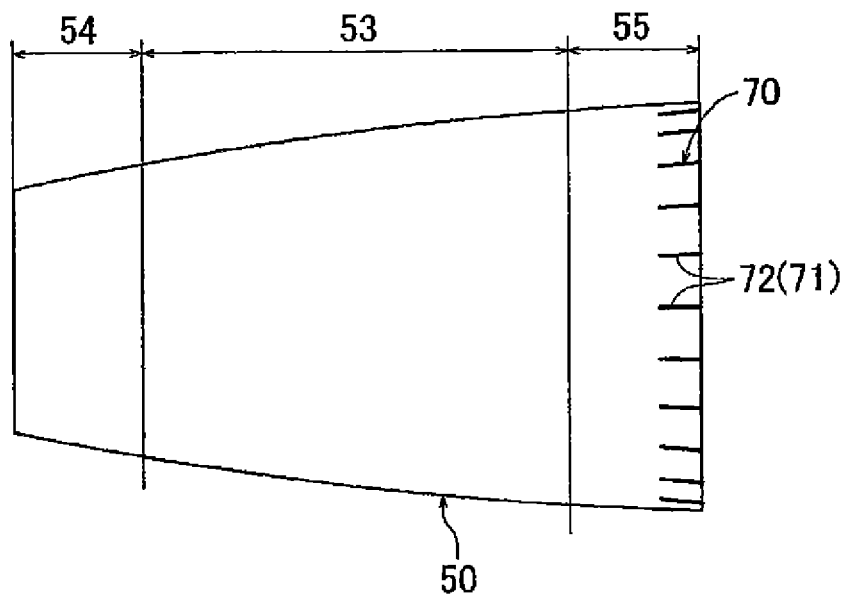
FIG. 3 is a side view illustrating the tapered roller in an enlarged manner, according to Embodiment 1.

Among bearing components including the inner ring 31, the outer ring 40, the tapered rollers 50, and the cage 60, a rotating component that rotates at the time of bearing rotation, for example, at least one of the inner ring 31, the tapered rollers 50, the cage 60 is provided with a vaporization promotion mechanism 70 that decreases a pressure of the lubricant at the time of bearing rotation so that the pressure of the lubricant reaches a saturation vapor pressure at which the lubricant changes from a liquid phase to a vapor phase. In Embodiment 1, the vaporization promotion mechanism 70 is constituted by roller vaporization promotion portions 71 respectively formed in the plurality of tapered rollers 50. The roller vaporization promotion portion 71 is constituted by a plurality of grooves 72 formed in at least one noncontact region on an outer peripheral surface of the tapered roller 50, i.e., at least one of a small-diameter side noncontact region 54 and a large-diameter side noncontact region 55, which are regions out of an effective rolling region 53. The plurality of grooves 72 is provided so as to extend axially and to be separated from each other at predetermined intervals in a circumferential direction. That is, as illustrated in FIGS. 2, 3, the outer peripheral surface of the tapered roller 50 is formed in a crowning shape that swells in a central part from both ends in its axial direction, in comparison with a truncated cone shape. The outer peripheral surface of the tapered roller 50 having the crowning shape is configured such that: the effective rolling region 53 making contact with the inner-ring raceway surface 32 and the outer-ring raceway surface 41 is set in the central part thereof in the axial direction; and the small-diameter side noncontact region 54 is provided on a small-diameter side out of both sides of the effective rolling region 53 in the axial direction, and the large-diameter side noncontact region 55 is provided on a large-diameter side. On an outer peripheral surface of at least one of the noncontact regions, i.e., the small-diameter side noncontact region 54 and the large-diameter side noncontact region 55, the plurality of grooves 72 is formed so as to extend axially and to be separated from each other at predetermined intervals in the circumferential direction. In Embodiment 1, the plurality of grooves 72 is formed on the outer peripheral surface of the large-diameter side noncontact region 55.

The tapered roller bearing according to Embodiment 1 is configured as described above. Accordingly, at the time of bearing rotation, the liquid lubricant flows through the annular space between the inner ring 31 and the outer ring 40. At this time, the pressure of the lubricant is decreased by the vaporization promotion mechanism 70 provided in the tapered rollers 50 as the rotating component among the bearing components, so that the pressure of the lubricant reaches the saturation vapor pressure at which the lubricant changes from the liquid phase to the vapor phase. Accordingly, the lubricant and the tapered rollers 50 are cooled off by evaporation heat of the lubricant that has changed from the liquid phase to the vapor phase.

Figure 4:
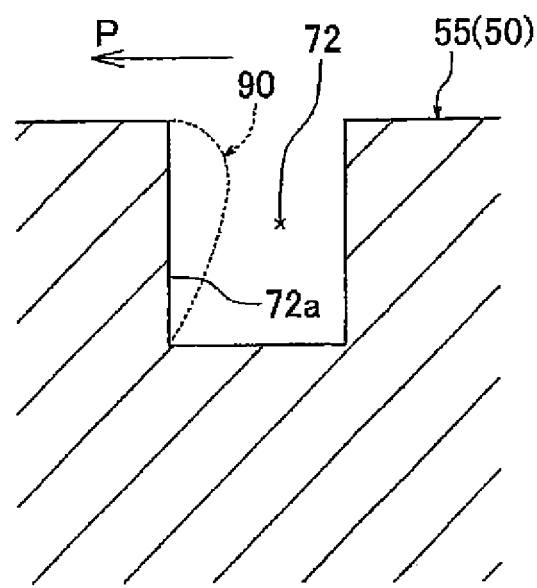
FIG. 4 is a sectional view illustrating, in an enlarged manner, a groove constituting a vaporization promotion portion as a vaporization promotion mechanism formed in a noncontact region of the tapered roller, according to Embodiment 1.

That is, in Embodiment 1, the roller vaporization promotion portions 71 are constituted by the plurality of grooves 72 formed on the outer peripheral surfaces of the tapered rollers 50, as the vaporization promotion mechanism 70. At the time of bearing rotation, a low-pressure part 90 occurs behind a groove wall surface 72a (a part surrounded by an alternate long and two short dashes line) out of both groove wall surfaces of the groove 72, as illustrated in FIG. 4. The groove wall surface 72a is that one of the groove wall surfaces of the groove 72 which is positioned on a front side in a rotation direction (an arrow-P direction). Further, the lubricant is easy to be changed into the vapor phase as the pressure becomes lower. Because of this, cavitation is caused in the lubricant in the low-pressure part 90, and the pressure of the lubricant reaches the saturation vapor pressure at which the lubricant changes from the liquid phase to the vapor phase. Accordingly, the lubricant is cooled off by evaporation heat of the lubricant that has changed from the liquid phase to the vapor phase. As such, without increasing the number of components and the number of man-hours for assembly, it is possible to cool off the lubricant by the vaporization promotion mechanism 70 provided in the tapered rollers 50 as the rotating component among the bearing components. As a result, it is possible to provide the tapered roller bearing 30 suitable as a rolling bearing for high-speed rotation.

Further, when the rotation number of the tapered roller bearing 30 at the time of bearing rotation is 1000 rpm or more, the pressure of the lubricant easily reaches the saturation vapor pressure at which the lubricant changes from the liquid phase to the vapor phase, due to the vaporization promotion mechanism 70, thereby making it possible to increase a cooling effect of the lubricant.

Further, it is possible to easily constitute the vaporization promotion mechanism 70 by the plurality of grooves 72 formed in the tapered rollers 50 as the roller vaporization promotion portions 71. Further, in at least one noncontact region (the large-diameter side noncontact region 55, in Embodiment 1) out of the small-diameter side noncontact region 54 and the large-diameter side noncontact region 55, which are placed outside the effective rolling region 53 on the outer peripheral surface of the tapered roller 50, the plurality of grooves 72 constituting the roller vaporization promotion portion 71 and extending axially is formed, thereby making it possible to restrain an adverse effect to a rolling performance of the tapered roller 50. Further, when the roller vaporization promotion portion 71 is constituted by forming the plurality of grooves 72 extending axially is formed in the large-diameter side noncontact region 55, it is possible to cool off frictional heat caused between the guideway 36 of the cone back face rib portion 35 of the inner ring 31 and the large end face 52 of the tapered roller 50, thereby yielding a large effect of restraining burning.

Further, the temperature of the lubricant in the tapered roller bearing 30 is at least the minimum temperature within the presumed temperature range of the lubricant at the time of bearing rotation. Accordingly, the pressure of the lubricant easily reaches the saturation vapor pressure at which the lubricant changes from the liquid phase to the vapor phase, due to the roller vaporization promotion portions 71, thereby making it possible to successfully cool off the lubricant and the tapered rollers 50. That is, in a case where the temperature of the lubricant is lower than the minimum temperature within the presumed temperature range of the lubricant at the time of bearing rotation, the pressure of the lubricant may not reach the saturation vapor pressure at which the lubricant changes from the liquid phase to the vapor phase. In this case, it is assumed that the cooling effect of the lubricant cannot be expected. However, it is possible to restrain an occurrence of such a problem.

Embodiment 2 of the present invention is described with reference to FIG. 1 and FIGS. 5 to 8. Structures except for the cage 60 are the same as in the above description about FIG. 1.

Figure 5:
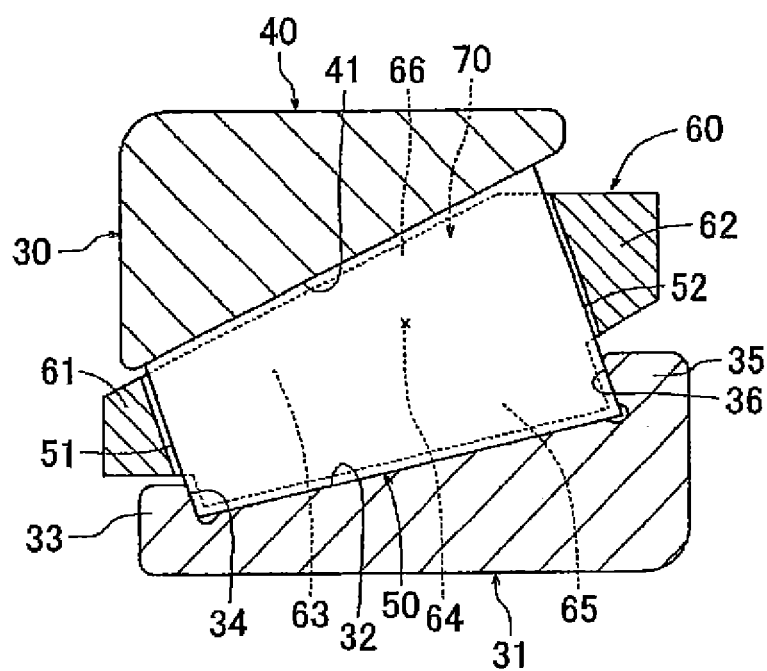
FIG. 5 is an axial sectional view illustrating a relationship between an inner ring, an outer ring, a tapered roller, and a cage in an enlarged manner, according to Embodiment 2.

In FIG. 5, a cage 60 includes: a small-diameter annular portion 61 and a large-diameter annular portion 62 separated from each other at a predetermined interval in an axial direction; and bar portions 63 connecting the annular portions 61, 62. Pockets 64 retaining tapered rollers 50 are formed in parts surrounded by the annular portions 61, 62 and the bar portions 63. A tapered roller bearing 30 is configured such that liquid lubricant flows through an annular space between an inner ring 31 and an outer ring 40. Further, a temperature of the lubricant in the tapered roller bearing 30 is at least a minimum temperature within a presumed temperature range of the lubricant at the time of bearing rotation. For example, a presumed temperature of the lubricant used for a power transmission device is 40° C. to 160° C. Thus, the temperature of the lubricant is 40° C. or more. Further, in Embodiment 2, a rotation number of the tapered roller bearing 30 at the time of bearing rotation is 1000 rpm or more.

Further, the cage 60 rotates in an arrow-P direction that is the same direction as a rotation direction of the inner ring 31 as a rotation-side bearing ring at the time of bearing rotation. Part of the cage 60 is provided with a vaporization promotion mechanism 70 that decreases a pressure of the lubricant at the time of bearing rotation so that the pressure of the lubricant reaches a saturation vapor pressure at which the lubricant changes from a liquid phase to a vapor phase. In Embodiment 2, the cage 60 including the small-diameter annular portion 61, the large-diameter annular portion 62, and the bar portions 63 is formed integrally from a resin material having heat resistance and abrasion resistance. Further, as illustrated in FIG. 5, 6 each of the bar portions 63 of the cage 60 is provided with a bore-side extending portion 65 extending inwardly in a radial direction, and an outside extending portion 66 extending outwardly in the radial direction. Further, a rear wall surface 67 of the bar portion 63 including the bore-side extending portion 65 and the outside extending portion 66, in the rotation direction (the arrow-P direction in FIG. 6) of the cage 60, is formed generally perpendicular to the rotation direction. The vaporization promotion mechanism 70 provided in the cage 60 is constituted by the rear wall surface 67. That is, in order to decrease the pressure of the lubricant, it is preferable that the rear wall surface 67 of the bar portion 63 extend as perpendicular as possible with respect to the rotation direction. However, the rear wall surface 67 may be displaced from a strictly vertical direction to some extent, provided that cavitation can be caused. Note that, among wall surfaces of the bar portion 63, a wall surface to be hit by the lubricant at the time of rotation of the cage 60 which lubricant exists in an area toward which the cage 60 rotates is referred to as a front wall surface 68, and a wall surface which is a back side relative to the front wall surface 68 and which is hardly hit by the lubricant due to interruption by the bar portion 63 at the time of rotation is referred to as the rear wall surface 67. Further, in consideration of a case where the tapered roller bearing 30 rotates reversibly, it is desirable that the front wall surface 68 of the bar portion 63 be also formed generally perpendicular to the rotation direction and a cross section of the bar portion 63 (a section in a direction perpendicular to the axial direction) be formed in a trapezoidal shape (see FIG. 6). That is, in a case where the tapered roller bearing 30 rotates reversibly, the front wall surface 68 of the bar portion 63 serves as the rear wall surface in the rotation direction.

Figure 6:
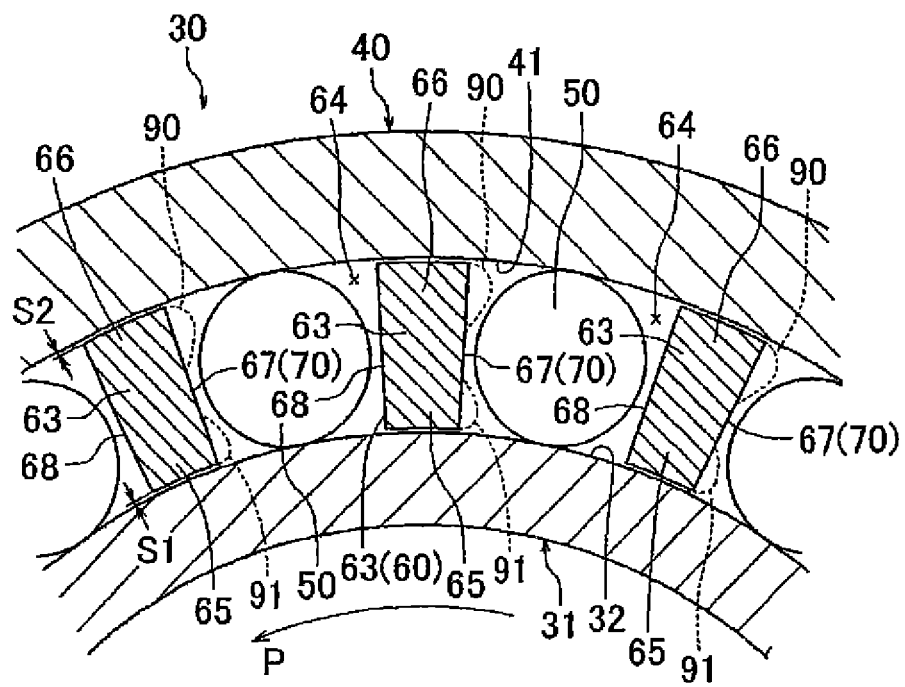
FIG. 6 is a sectional view illustrating, in an enlarged manner, bar portions of the cage in a direction perpendicular to an axial direction, according to Embodiment 2.

Further, in Embodiment 2, as illustrated in FIG. 6, a bore surface of the bore-side extending portion 65 is provided close to an inner-ring raceway surface 32 of the inner ring 31 with a minute gap, so as to form a bore-side gap portion S1 between the bore surface of the bore-side extending portion 65 and the inner-ring raceway surface 32 of the inner ring 31. Further, an outside surface of the outside extending portion 66 is provided close to an outer-ring raceway surface 41 of the outer ring 40 with a minute gap, so as to form an outside gap portion S2 between the outside surface of the outside extending portion 66 and the outer-ring raceway surface 41 of the outer ring 40. The vaporization promotion mechanism 70 provided in the cage 60 is constituted by a combination of the rear wall surface 67 of the bar portion 63 including the bore-side extending portion 65 and the outside extending portion 66, the bore-side gap portion S1, and the outside gap portion 52.

The tapered roller bearing according to Embodiment 2 is configured as described above. Accordingly, the liquid lubricant flows through the annular space between the inner ring 31 and the outer ring 40 at the time of bearing rotation. At this time, the pressure of part of the lubricant reaches the saturation vapor pressure at which the lubricant changes from the liquid phase to the vapor phase, due to the vaporization promotion mechanism 70 provided in part of the cage 60, thereby causing cavitation in the lubricant. Hereby, the lubricant is cooled off by evaporation heat of the lubricant that has changed from the liquid phase to the vapor phase. As such, without increasing the number of components and the number of man-hours for assembly, it is possible to cool off the lubricant by the vaporization promotion mechanism 70 provided in part of the cage 60.

In Embodiment 2, the bar portion 63 of the cage 60 is provided with the bore-side extending portion 65 extending inwardly in the radial direction, and the outside extending portion 66 extending outwardly in the radial direction. Further, that rear wall surface 67 of the bar portion 63 which includes the bore-side extending portion 65 and the outside extending portion 66 of the bar portion 63, in the rotation direction of the cage 60, is formed generally perpendicular to the rotation direction. The vaporization promotion mechanism 70 provided in the cage 60 is constituted by the rear wall surface 67. Accordingly, at the time of bearing rotation, a region where low-pressure parts 90, 91 occur is increased behind the rear wall surface 67 of the bar portion 63, in comparison with a structure (a bar portion of a conventional cage) in which the bar portion is not provided with the bore-side and outside extending portions. Accordingly, it is possible to promote the occurrence of cavitation in the low-pressure parts 90, 91 behind the rear wall surface 67 of the bar portion 63 of the cage 60. This consequently makes it possible to increase a cooling effect of the lubricant.

Further, in Embodiment 2, the vaporization promotion mechanism 70 provided in the cage 60 is constituted by a combination of that rear wall surface 67 of the bar portion 63 which includes the bore-side extending portion 65 and the outside extending portion 66, the bore-side gap portion S1, and the outside gap portion S2. Further, since the bore-side gap portion S1 and the outside gap portion 52 are provided, the lubricant is hard to flow into the rear wall surface 67 of the bar portion 63. Hereby, the lubricant around the rear wall surface 67 of the bar portion 63 is easy to be reduced along with the rotation of the cage 60, so that the pressure of the lubricant is easy to be decreased. Accordingly, it is possible to further promote the occurrence of cavitation behind the rear wall surface 67 of the bar portion 63, thereby increasing the cooling effect. Further, an amount of the lubricant entering into the bearing is reduced, thereby yielding a large effect for torque reduction.

Further, when the rotation number of the tapered roller bearing 30 at the time of bearing rotation is 1000 rpm or more, the pressure of the lubricant easily reaches the saturation vapor pressure at which the lubricant changes from the liquid phase to the vapor phase, due to the vaporization promotion mechanism 70 provided in part of the cage 60, thereby increasing the cooling effect of the lubricant. Further, when the rotation number of the tapered roller bearing 30 at the time of bearing rotation is 1000 rpm or more, it is also possible to obtain an effect for torque reduction.

Figure 7:
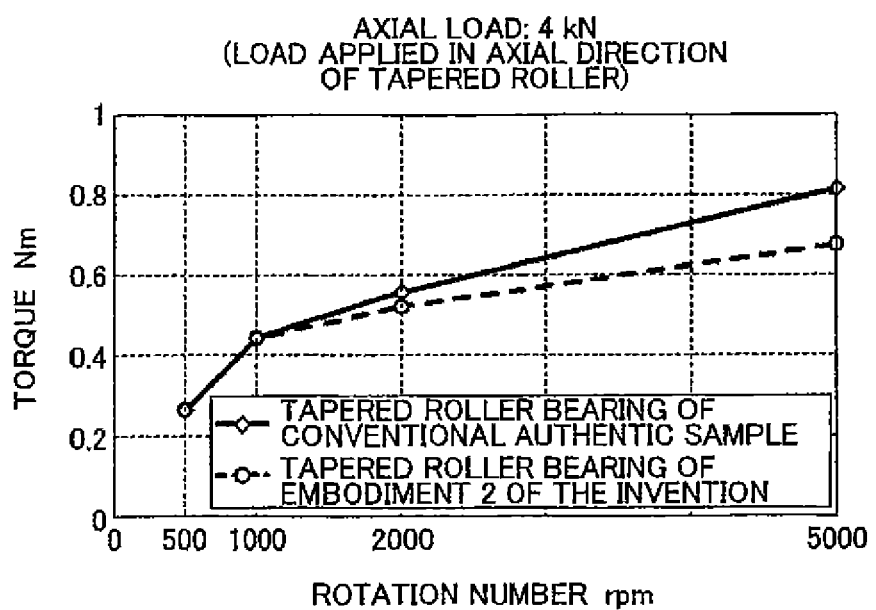
FIG. 7 is an explanatory view illustrating a graph of examinations on the tapered roller bearing of Embodiment 2 and a tapered roller bearing of a conventional authentic sample in terms of a relationship between a rotation number and a torque in a state where an axial load 4 kN is applied to their tapered rollers.
Figure 8:
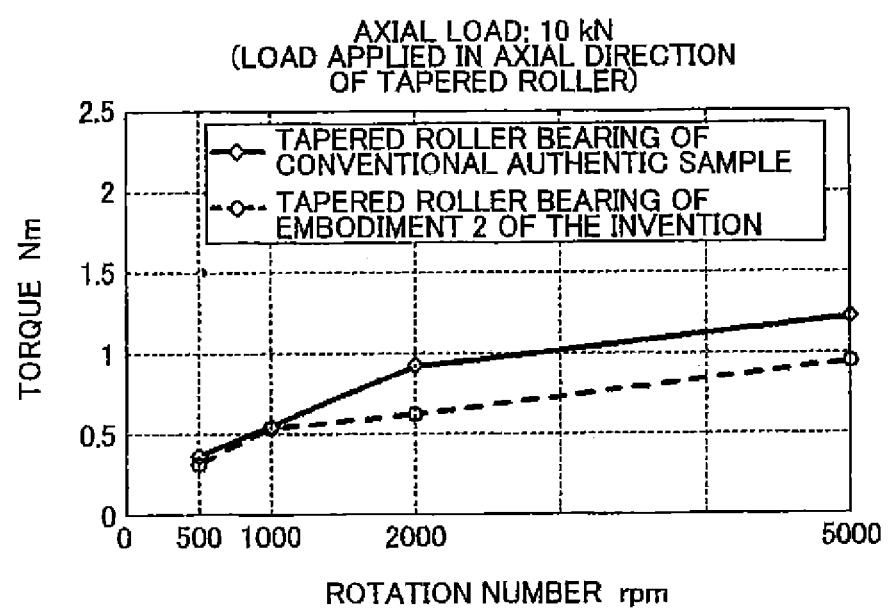
FIG. 8 is an explanatory view illustrating a graph of examinations on the tapered roller bearing of Embodiment 2 and the tapered roller bearing of the conventional authentic sample in terms of a relationship between a rotation number and a torque in a state where an axial load 10 kN is applied to their tapered rollers.

Examinations were performed on the following tapered roller bearings: the tapered roller bearing 30 of Embodiment 2 configured such that that rear wall surface 67 of the bar portion 63 of the cage 60 which includes the bore-side extending portion 65 and the outside extending portion 66 is formed generally perpendicular to the rotation direction so as to constitute the vaporization promotion mechanism 70 provided in the cage 60; and a tapered roller bearing of a conventional authentic sample configured such that no bore-side and outside extending portions are provided in a bar portion of a cage. Results as illustrated in FIGS. 7, 8 were obtained. FIG. 7 deals with a case where an axial load (a load applied axially) to the tapered roller 50 is 4 kN, and a horizontal axis indicates a rotation number rpm at the time of bearing rotation, and a vertical axis indicates a torque Nm. Further, FIG. 8 deals with a case where the axial load (the load applied axially) to the tapered roller 50 is 10 kN, and a horizontal axis indicates a rotation number rpm at the time of bearing rotation, and a vertical axis indicates a torque Nm. As illustrated in FIGS. 7, 8, it is found that in both of the cases where the axial load is 4 kN and where the axial load is 10 kN, when the rotation number at the time of bearing rotation exceeds 1000 rpm, a torque of the tapered roller bearing 30 of Embodiment 2 is reduced more than that of the tapered roller bearing of the conventional authentic sample. Particularly, in the case where the axial load is 10 kN, when the rotation number at the time of bearing rotation exceeds 1000 rpm, the torque of the tapered roller bearing 30 of Embodiment 2 is reduced markedly in comparison with that of the tapered roller bearing of the conventional authentic sample.

Next will be described Embodiment 3 of the present invention with reference to FIG. 1 and FIGS. 9 to 12. Structures except for the inner ring 31 are the same as in the description about FIG. 1.

Figure 9:
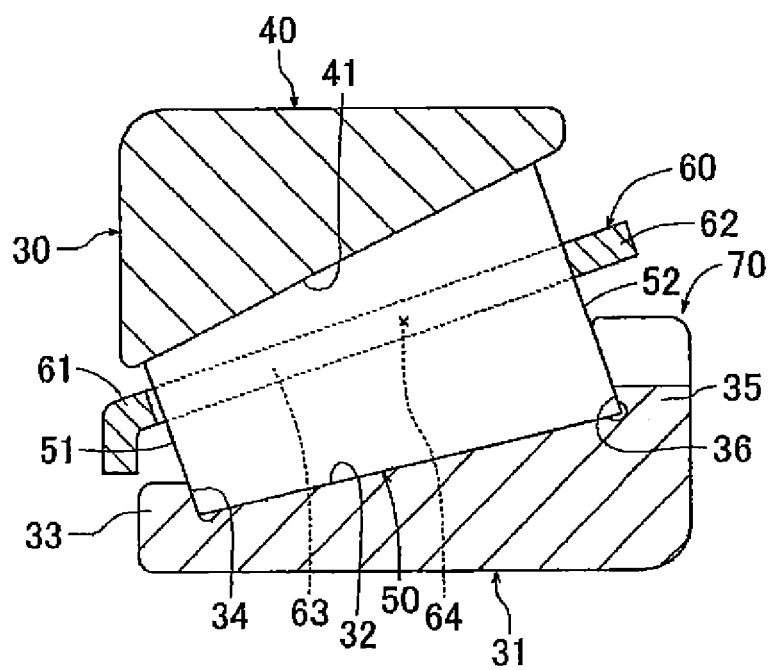
FIG. 9 is an axial sectional view illustrating a relationship between an inner ring, an outer ring, a tapered roller, and a cage in an enlarged manner, according to Embodiment 3.
Figure 10:
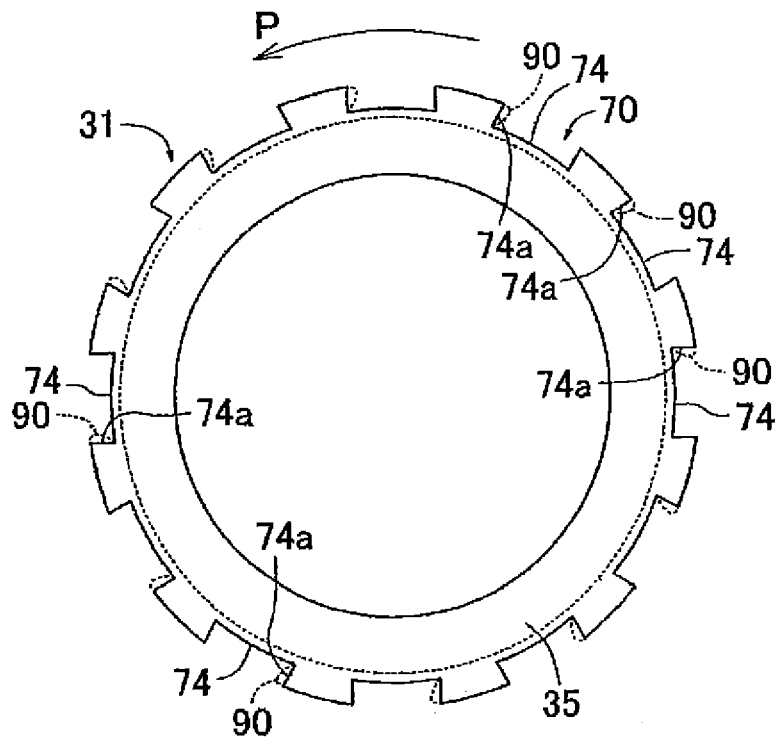
FIG. 10 is a front view illustrating a cone back face rib portion of the inner ring as a rotation-side bearing ring, according to Embodiment 3.

In FIG. 9, in bearing rings of an inner ring 31 and an outer ring 40, a rotation-side bearing ring configured to rotate at the time of bearing rotation, that is, the inner ring 31 in Embodiment 3, is provided with a vaporization promotion mechanism 70 that decreases a pressure of part of lubricant at the time of bearing rotation so that the pressure of the lubricant reaches a saturation vapor pressure at which the lubricant changes from a liquid phase to a vapor phase. As illustrated in FIGS. 9, 10, the vaporization promotion mechanism 70 provided in the bearing ring is constituted by axial recessed portions 74 (or projection portions) formed in at least one rib portion out of a cone front face rib portion 33 and a cone back face rib portion 35 of the inner ring 31 as the rotation-side bearing ring. In Embodiment 3, a plurality of axial recessed portions (groove-shaped recessed portions) 74 is formed in a circumferential direction at predetermined intervals on an outer peripheral part of the cone back face rib portion 35 of the inner ring 31.

Embodiment 3 is configured as described above. Accordingly, liquid lubricant flows through an annular space between the inner ring 31 and the outer ring 40 at the time of bearing rotation. At this time, a pressure of part of the lubricant reaches the saturation vapor pressure at which the lubricant changes from the liquid phase to the vapor phase, due to the vaporization promotion mechanism 70 provided in the inner ring 31 as the rotation-side bearing ring, thereby causing cavitation in the lubricant. That is, in Embodiment 3, the plurality of axial recessed portions 74 serving as the vaporization promotion mechanism 70 provided in the bearing ring is formed in the circumferential direction at predetermined intervals on an outer peripheral surface of the cone back face rib portion 35 of the inner ring 31 as the rotation-side bearing ring. In view of this, at the time of bearing rotation, a low-pressure part 90 (a part illustrated by an alternate long and two short dashes line in FIG. 10) occurs behind a groove wall surface 74a placed at a front side in a rotation direction (an arrow-P direction in FIG. 10), out of both groove wall surfaces of each of the recessed portions 74. Further, the lubricant is easy to be changed into the vapor phase as the pressure becomes lower. In view of this, in the low-pressure part 90, cavitation is caused in the lubricant, so that the pressure of part of the lubricant reaches the saturation vapor pressure at which the lubricant changes from the liquid phase to the vapor phase. Accordingly, the lubricant is cooled off by evaporation heat of the lubricant that has changed from the liquid phase to the vapor phase. As such, without increasing the number of components and the number of man-hours for assembly, it is possible to cool off the lubricant by the vaporization promotion mechanism 70 provided in the inner ring 31 as the rotation-side bearing ring. As a result, it is possible to provide the tapered roller bearing 30 suitable as a rolling bearing for high-speed rotation.

Further, when a rotation number of the tapered roller bearing 30 at the time of bearing rotation is 1000 rpm or more, the pressure of the lubricant easily reaches the saturation vapor pressure at which the lubricant changes from the liquid phase to the vapor phase, due to the vaporization promotion mechanism 70 provided in the bearing ring, thereby increasing a cooling effect of the lubricant. Further, when the rotation number of the tapered roller bearing 30 at the time of bearing rotation is 1000 rpm or more, it is also possible to obtain an effect for torque reduction.

Figure 11:
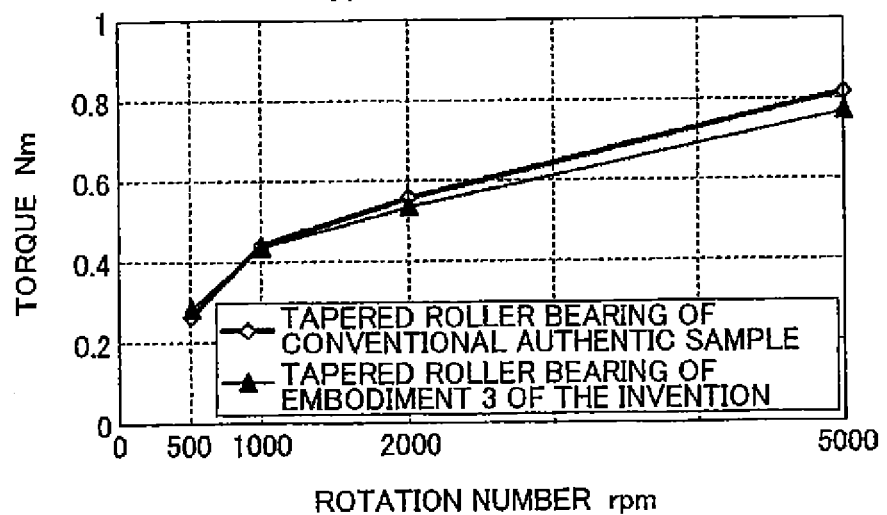
FIG. 11 is an explanatory view illustrating a graph of examinations on the tapered roller bearing of Embodiment 3 and the tapered roller bearing of the conventional authentic sample in terms of a relationship between a rotation number and a torque in a state where an axial load 4 kN is applied to their tapered rollers.
Figure 12:
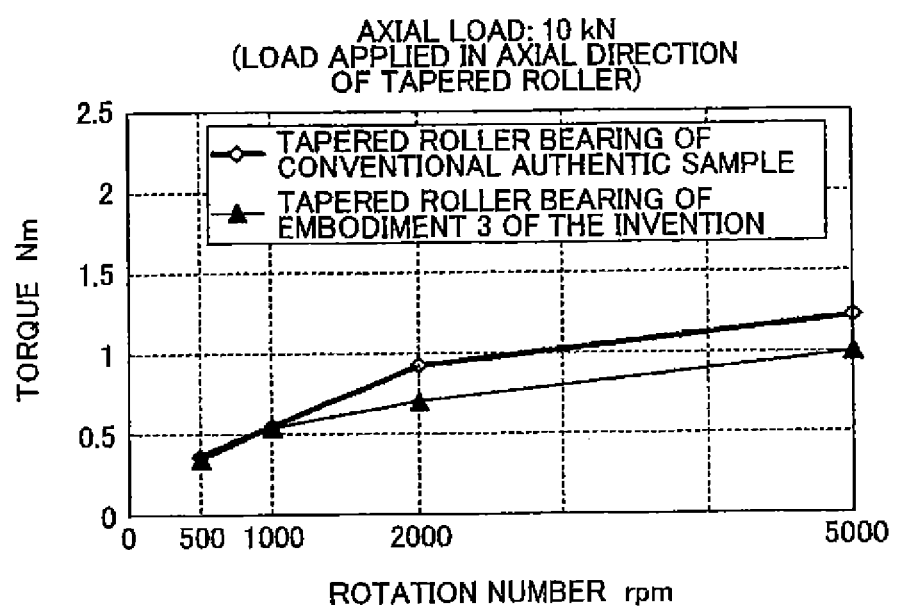
FIG. 12 is an explanatory view illustrating a graph of examinations on the tapered roller bearing of Embodiment 3 and the tapered roller bearing of the conventional authentic sample in terms of a relationship between a rotation number and a torque in a state where an axial load 10 kN is applied to their tapered rollers.

Examinations were performed on the following tapered roller bearings: the tapered roller bearing 30 of Embodiment 3 configured such that the plurality of axial recessed portions 74 having a groove shape and serving as the vaporization promotion mechanism 70 provided in the bearing ring is formed in the circumferential direction at predetermined intervals on the outer peripheral surface of the cone back face rib portion 35 of the inner ring 31 as the rotation-side bearing ring; and a tapered roller bearing of a conventional authentic sample configured such that the vaporization promotion mechanism 70 is not provided on an outer peripheral surface of an inner ring 31. Results illustrated in FIGS. 11, 12 were provided. FIG. 11 deals with a case where an axial load (a load applied in an axial direction of a tapered roller 50) to the tapered roller 50 is 4 kN, and a horizontal axis indicates a rotation number rpm at the time of bearing rotation, and a vertical axis indicates a torque Nm. Further, FIG. 12 deals with a case where the axial load (the load applied in the axial direction of the tapered roller 50) to the tapered roller 50 is 10 kN, and a horizontal axis indicates a rotation number rpm at the time of bearing rotation, and a vertical axis indicates a torque Nm. As illustrated in FIGS. 11, 12, it is found that in both of the cases where the axial load is 4 kN and where the axial load is 10 kN, when the rotation number at the time of bearing rotation exceeds 1000 rpm, a torque of the tapered roller bearing 30 of Embodiment 3 is reduced more than that of the tapered roller bearing of the conventional authentic sample. Particularly, in the case where the axial load is 10 kN, when the rotation number at the time of bearing rotation exceeds 1000 rpm, the torque of the tapered roller bearing 30 of Embodiment 3 is reduced markedly in comparison with that of the tapered roller bearing of the conventional authentic sample.

Further, in Embodiment 3, the plurality of axial recessed portions 74 is formed in the circumferential direction at predetermined intervals on the outer peripheral surface of the cone back face rib portion 35 of the inner ring 31 as the rotation-side bearing ring, thereby constituting the vaporization promotion mechanism 70 provided in the bearing ring. This makes it possible to cool off frictional heat caused between a guideway 36 of the cone back face rib portion 35 of the inner ring 31 and a large end face 52 of the tapered roller 50, thereby yielding a large effect of restraining burning. Further, the plurality of axial recessed portions 74 increases a surface area of the outer peripheral surface of the cone back face rib portion 35 of the inner ring 31, thereby making it possible to increase a heat dissipation property just by that much.

Further, a temperature of the lubricant in the tapered roller bearing 30 is at least a minimum temperature within a presumed temperature range of the lubricant at the time of bearing rotation. Accordingly, the pressure of part of the lubricant easily reaches the saturation vapor pressure at which the lubricant changes from the liquid phase to the vapor phase, due to the vaporization promotion portion 70 provided in the bearing ring, thereby making it possible to successfully cool off the lubricant and the tapered rollers 50. That is, in a case where the temperature of the lubricant is lower than the minimum temperature within the presumed temperature range of the lubricant at the time of bearing rotation, the pressure of the lubricant may not reach the saturation vapor pressure at which the lubricant changes from the liquid phase to the vapor phase. In this case, it is assumed that the cooling effect of the lubricant and a rotating component cannot be expected. However, it is possible to restrain an occurrence of such a problem.

Figure 13:
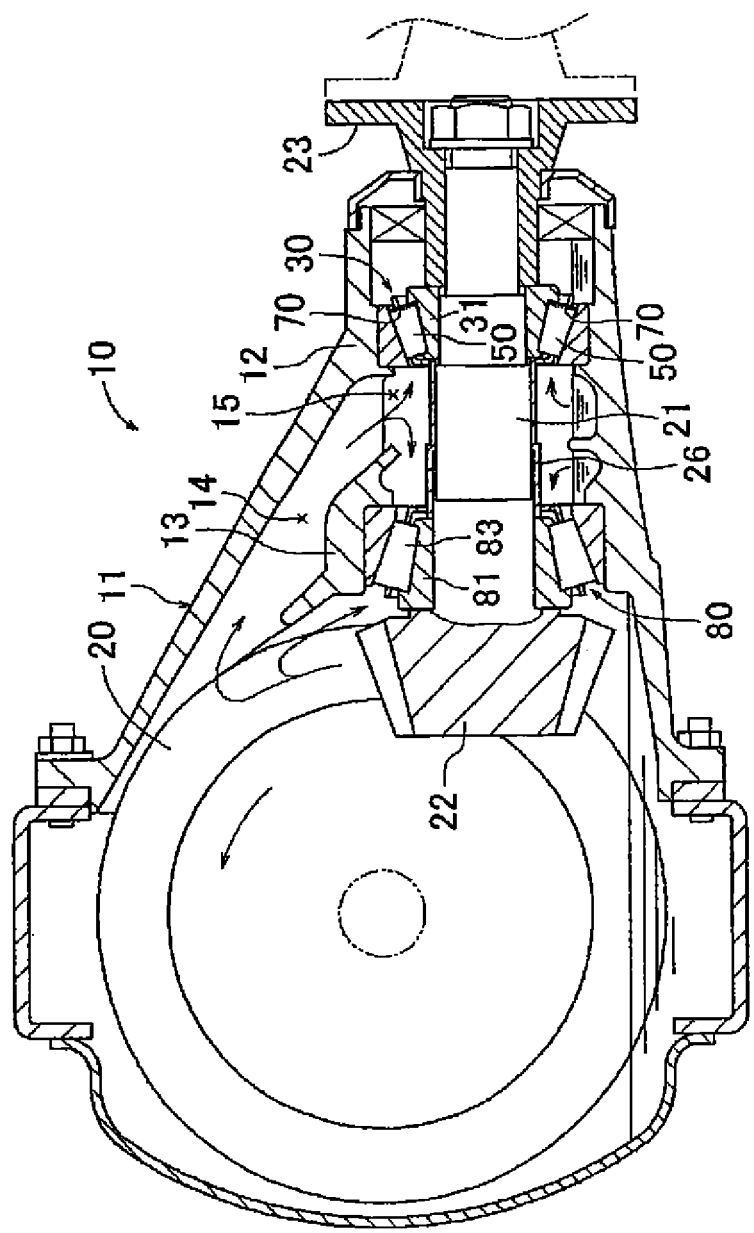
FIG. 13 is an axial sectional view illustrating a differential device as a power transmission device using the tapered roller bearing according to Embodiment 1.
Figure 14:
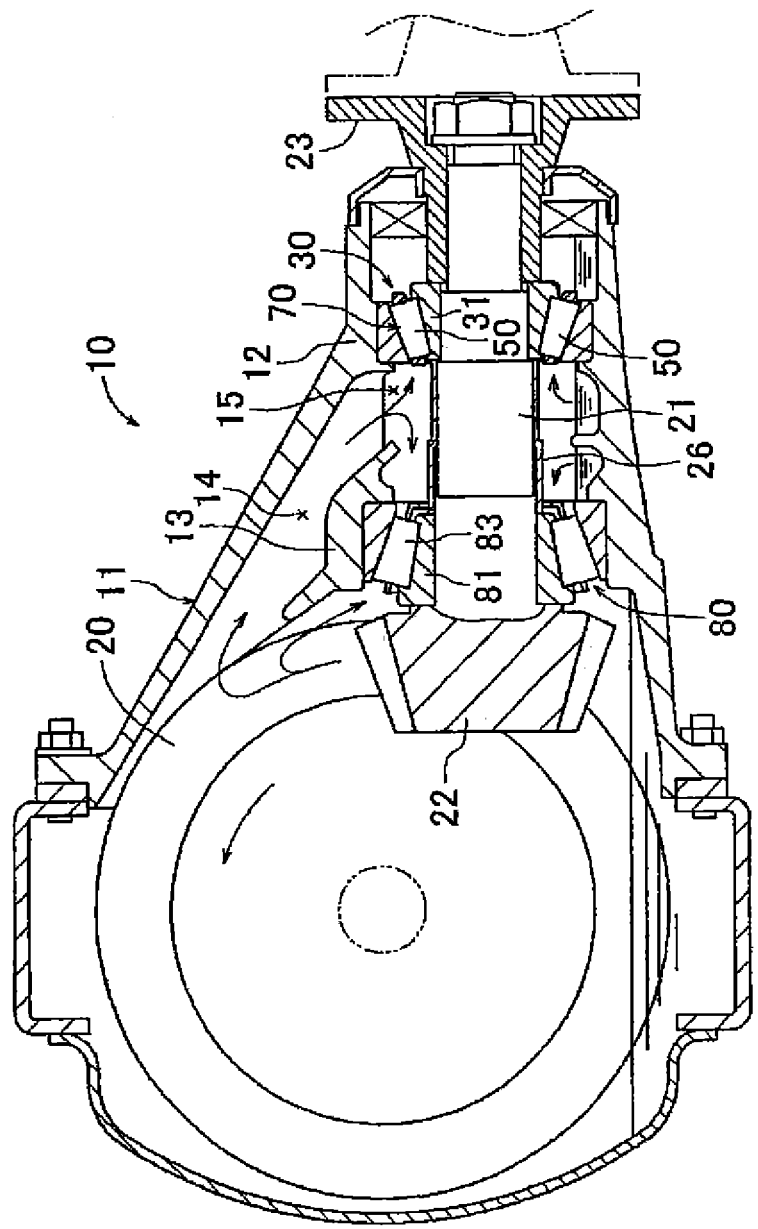
FIG. 14 is an axial sectional view illustrating a differential device as a power transmission device using the tapered roller bearing according to Embodiment 2.
Figure 15:
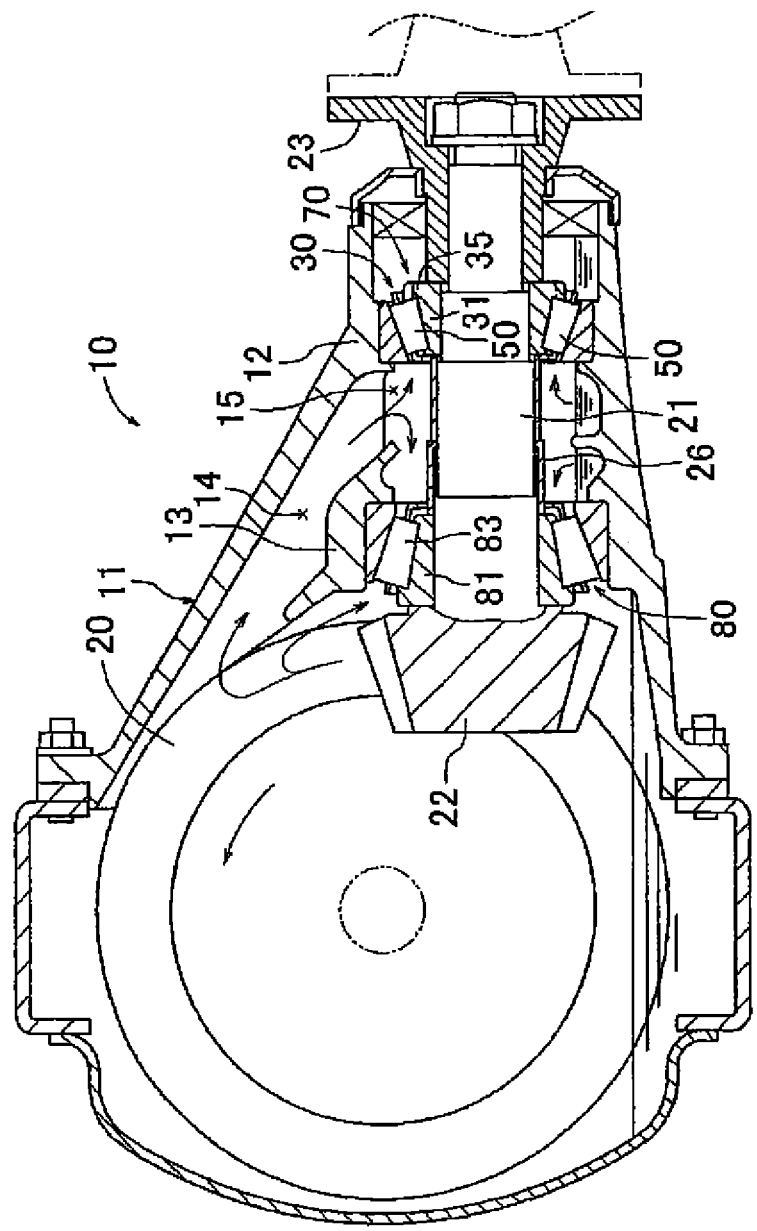
FIG. 15 is an axial sectional view illustrating a differential device as a power transmission device using the tapered roller bearing according to Embodiment 3.

Next will be described differential devices 10 as a power transmission device respectively using the tapered roller bearings 30 described in Embodiments 1 to 3, with reference to FIGS. 13 to 15. As illustrated in FIGS. 13 to 15, inside a differential carrier 11 of each of the differential devices 10, bearing housings 12, 13 provided at a predetermined interval in an axial direction are formed. Front and rear tapered roller bearings 30, 80 for rotatably supporting front and rear parts of a pinion shaft 21 (corresponding to a rotating shaft of the present invention) are assembled to the bearing housing 12, 13, respectively. At least the tapered roller bearing 30 out of the tapered roller bearings 30, 80 is the tapered roller bearing as described in Embodiments 1 to 3.

Further, one end of both ends of the pinion shaft 21 projects from the differential carrier 11, and a companion flange 23 connected to a propeller shaft (not shown) is assembled to the one end. A pinion 22 meshing with a ring gear 20 assembled to a differential case (not shown) in the differential carrier 11 is provided in the other end of the pinion shaft 21 in a torque transmittable manner. A final drive mechanism is constituted by the ring gear 20 and the pinion 22. Further, a spacer member 26 is provided between inner rings 31, 81 of the tapered roller bearings 30, 80. Further, lubricant is filled in a lower part of the differential carrier 11 at a predetermined oil level, so as to be sealed therein. Note that, as well known, a differential gear is provided in the differential case (not shown).

As illustrated in FIGS. 13 to 15, a lubricant passage 14 into which the lubricant brought upward by a rotation of the ring gear 20 is formed in an upper part of the bearing housing 12 in the differential carrier 11, and a supply port 15 for supplying the lubricant flowing through the lubricant passage to the tapered roller bearings 30, 80 is formed above between the bearing housings 12, 13.

The differential devices 10 as the power transmission devices using the tapered roller bearings 30 described in Embodiments 1 to 3 are configured as described above. Accordingly, at the time of running or the like of a vehicle, the lubricant stored in the lower part of the differential carrier 11 is stirred along with a rotation of the ring gear 20, and the lubricant partially flows into the lubricant passage 14 and flows toward the supply port 15. Then, the lubricant is supplied from the supply port to small-diameter sides of respective annular spaces of the front and rear tapered roller bearings 30, 80. The inner rings 31, 81 of the tapered roller bearings 30, 80 rotate integrally with the pinion shaft 21 that rotates upon receipt of a torque transmitted from the ring gear 20. Hereby, the tapered rollers 50 roll and the cage 60 rotates. Further, the lubricant supplied to the small-diameter sides of the respective annular spaces of the front and rear tapered roller bearings 30, 80 flows toward large-diameter sides of the annular spaces by a pumping action based on the rolling of the tapered rollers 50, so that the lubricant is discharged.

At least the tapered roller bearing 30 out of the front and rear tapered roller bearings 30, 80 is the tapered roller bearing as described in Embodiment 1. Consequently, it is possible to cool off the lubricant by the vaporization promotion mechanism 70 provided in the tapered roller bearing 30, thereby making it possible to save troubles of manufacture and assembly of an exclusive cooling member for cooling off the lubricant.

Note that the present invention is not limited to Embodiment 1, and can be performed in various embodiments within a gist of the present invention. For example, Embodiment 1 exemplifies a case where the vaporization promotion mechanism 70 is provided in the tapered roller 50. However, the vaporization promotion mechanism 70 may be provided in any rotating component that rotates at the time of bearing rotation, among bearing components including the inner ring 31, the outer ring 40, the tapered rollers 50, and the cage 60. For example, the vaporization promotion mechanism. 70 can be provided in the inner ring 31 or the cage 60. Further, the power transmission device may be other devices except for the differential device, and may be a transaxle device or the like, for example.

Figure 16:
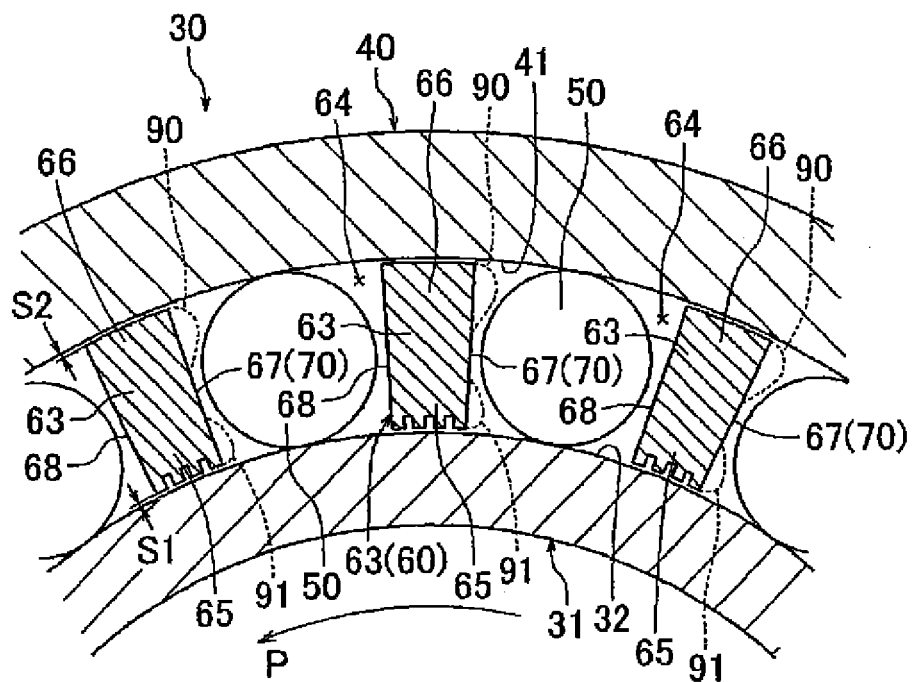
FIG. 16 is a sectional view in a direction perpendicular to an axial direction and illustrating, in an enlarged manner, bar portions of a cage of a tapered roller bearing according to another embodiment of the present invention.
Figure 17:
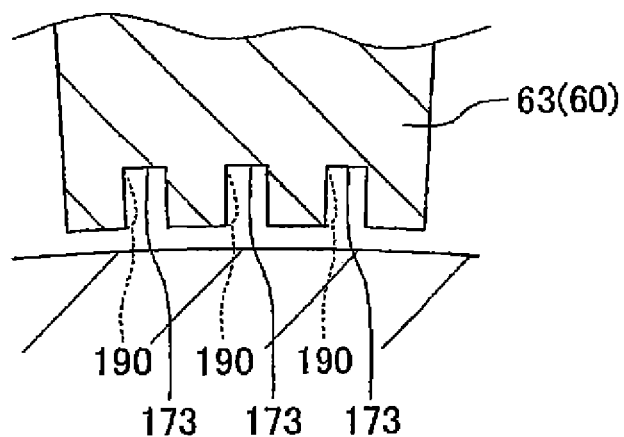
FIG. 17 is a sectional view in a direction perpendicular to an axial direction and illustrating, in an enlarged manner, a state where recessed portions extending axially are formed in a bore-side extending portion of a bar portion of a cage of a tapered roller bearing according to another embodiment of the present invention.

Further, the present invention is not limited to Embodiment 2, and can be performed in various embodiments within the gist of the present invention. For example, as illustrated in FIGS. 16, 17, recessed portions 173 or projection portions extending axially may be formed on an a bore surface of at least one extending portion (a bore-side extending portion 65 in FIG. 16) out of the bore-side extending portion 65 and an outside extending portion 66 of a bar portion 63 of a cage 60. When the recessed portions 173 or projection portions extending axially are formed on the bore surface of the bore-side extending portion 65 as such, it is possible to cause low-pressure parts 190 even in the recessed portions 173 or projection portions. Hereby, it is possible to cool off the lubricant by causing cavitation in the lubricant.

Figure 18:
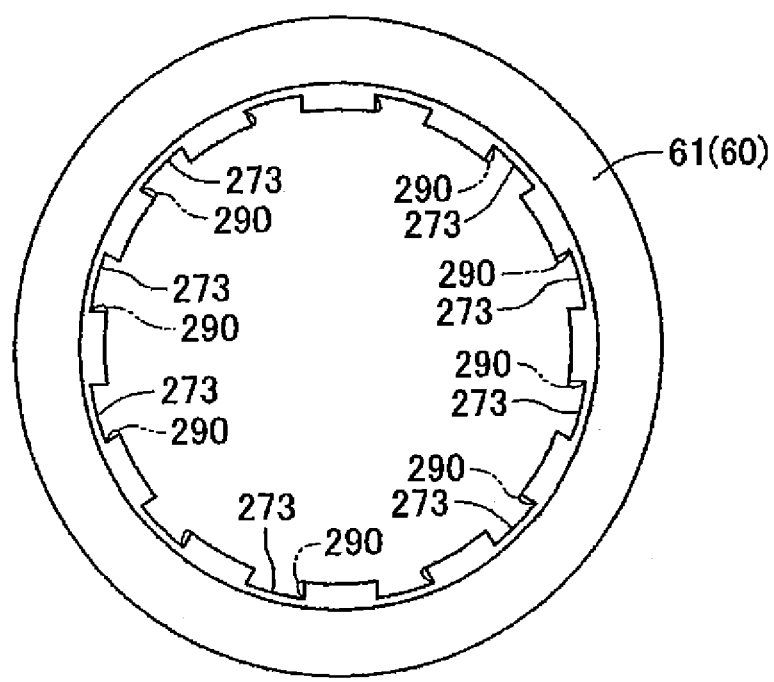
FIG. 18 is an axial sectional view illustrating, in an enlarged manner, a state where recessed portions extending axially are formed on an inner peripheral surface of a small-diameter-side circular portion of a cage of a tapered roller bearing according to another embodiment of the present invention.

Further, as illustrated in FIG. 18, recessed portions 273 or projection portions extending axially may be formed on an outer peripheral surface or an inner peripheral surface of at least one annular portion of a small-diameter annular portion 61 and a large-diameter annular portion 62 of a cage 60, for example, on the inner peripheral surface of the small-diameter annular portion 61. When the recessed portions 273 or projection portions extending axially are formed on the inner peripheral surface of the small-diameter annular portion 61 of the cage 60 as such, it is possible to cause low-pressure parts 290 even in the recessed portions 273 or projection portions. Hereby, it is possible to cool off the lubricant by causing cavitation in the lubricant. Further, the recessed portions 273 or the projection portions on the inner peripheral surface of the small-diameter annular portion 61 of the cage 60 are able to cause air bubbles (microbubbles) in the lubricant by the rotation of the cage 60 along with bearing rotation and to mix the air bubbles therein. This makes it possible to decrease viscosity of the lubricant due to the air bubbles caused in the lubricant, which is effective for torque reduction. Further, the power transmission device may be other devices except for the differential device, and may be a transaxle device or the like, for example.

Figure 19:
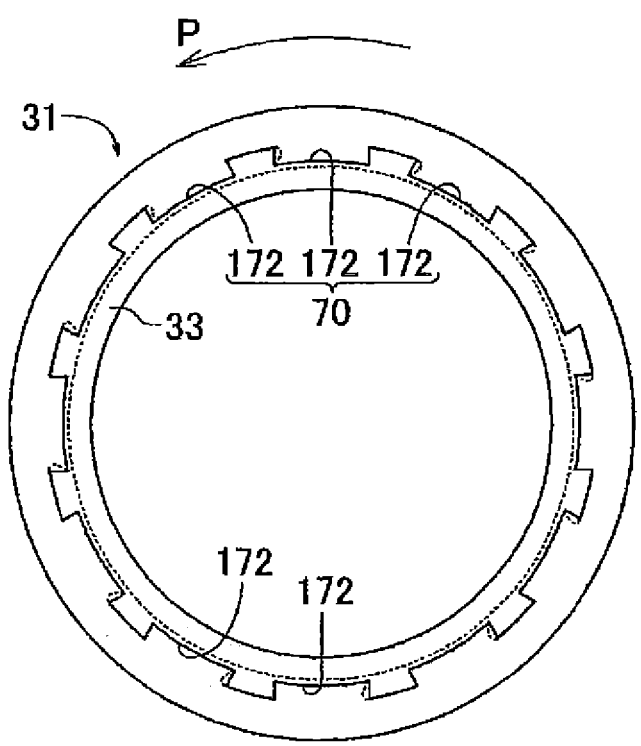
FIG. 19 is an explanatory view illustrating a state where axial recessed portions or projecting portions constituting a vaporization promotion mechanism provided in a bearing ring are formed in a cone front face rib portion of an inner ring of a tapered roller bearing according to another embodiment of the present invention.

Further, the present invention is not limited to Embodiment 3, and can be performed in various embodiments within the gist of the present invention. For example, Embodiment 3 exemplifies a case where the vaporization promotion mechanism 70 provided in the bearing ring is the plurality of axial recessed portion 74 provided on the outer circumference of the cone back face rib portion 35 of the inner ring 31 as the rotation-side bearing ring. However, even if axial projection portions are provided instead of the axial recessed portions 74, the present invention can be performed. Further, as illustrated in FIG. 19, the vaporization promotion mechanism 70 provided in the bearing ring may be constituted by forming a plurality of axial recessed portions 172 (or axial projection portions) on an outer peripheral surface of a cone front face rib portion 33 of an inner ring 31 as the rotation-side bearing ring. Further, the plurality of axial recessed portions 172 (or the plurality of axial projection portions) are able to cause air bubbles (microbubbles) in the lubricant by the rotation of the inner ring 31 as the rotation-side bearing ring along with bearing rotation and to mix the air bubbles therein. This makes it possible to decrease viscosity of the lubricant due to the air bubbles caused in the lubricant, which is effective for torque reduction That is, the lubricant flows from a front-face-rib-portion-33 side of the inner ring 31 and flows out toward a cone-back-face-rib-portion-35 side, due to a pumping action of a tapered roller bearing 30 at the time of bearing rotation. In view of this, the plurality of axial recessed portions 172 (or the axial projection portions) is formed on the outer peripheral surface of the cone front face rib portion 33, so as to cause air bubbles in the lubricant on a lubricant-inflow side, thereby making it possible to decrease viscosity of the lubricant. Hereby, in comparison with a case where the plurality of axial recessed portions 172 (or the axial projection portions) is formed in the cone back face rib portion, it is possible to yield a large effect for torque reduction due to a decrease of the viscosity of the lubricant. Further, the power transmission device may be other devices except for the differential device, and may be a transaxle device or the like, for example.

What is claimed is:

1. A tapered roller bearing, comprising:
    an inner ring;
    an outer ring spaced from an outer peripheral surface of the inner ring by an annular space, the outer ring and the inner ring being concentric about an axis;
    a plurality of tapered rollers rollably disposed in the annular space; and
    a cage retaining the plurality of tapered rollers, wherein:
    liquid lubricant flows through the annular space; and
    among the inner ring, the outer ring, the plurality of tapered rollers, and the cage, at least one rotating component configured to rotate at the time of bearing rotation is provided with a vaporization promotion mechanism configured to decrease a pressure of the liquid lubricant at a time of bearing rotation so that the pressure of the liquid lubricant reaches a saturation vapor pressure at which the liquid lubricant changes from a liquid phase to a vapor phase.

2. The tapered roller bearing according to claim 1, wherein:
    the vaporization promotion mechanism comprises roller vaporization promotion portions formed in the tapered rollers.

3. The tapered roller bearing according to claim 2, wherein:
    the roller vaporization promotion portions are each formed from a plurality of grooves extending axially and formed in a noncontact region of an outer peripheral surface of each of the plurality of tapered rollers, the noncontact region being a region outside an effective rolling region of the outer peripheral surface of the each of the plurality of tapered rollers.

4. The tapered roller bearing according to claim 1, wherein:
    the vaporization promotion mechanism is provided in the cage.

5. The tapered roller bearing according to claim 4, wherein:
    a rotation number at the time of bearing rotation is 1000 rpm or more.

6. The tapered roller bearing according to claim 4, wherein:
    the cage includes an annular portion, bar portions extending axially from the annular portion, and pockets formed by the annular portion and the bar portions;
    each of the bar portions includes a bore-side extending portion extending inwardly in a radial direction, and an outside extending portion extending outwardly in the radial direction;
    a rear wall surface of the bar portion including the bore-side extending portion and the outside extending portion, in terms of a rotation direction of the cage, is formed generally perpendicularly to the rotation direction; and
    the vaporization promotion mechanism is constituted by the rear wall surface.

7. The tapered roller bearing according to claim 6, wherein:
    a bore surface of the bore-side extending portion is provided close to an inner-ring raceway surface of the outer peripheral surface of the inner ring, so as to form a bore-side gap portion between the bore surface of the bore-side extending portion and the outer peripheral surface of the inner ring;
    an outside surface of the outside extending portion is provided close to an outer-ring raceway surface of an inner peripheral surface of the outer ring, so as to form an outside gap portion between the outside surface of the outside extending portion and the inner peripheral surface of the outer ring; and the vaporization promotion mechanism is constituted by a combination of the bore-side gap portion, the outside gap portion, and the rear wall surface.

8. The tapered roller bearing according to claim 6, wherein:
a recessed portion or a projection portion extending axially is formed on a peripheral surface of at least one of the bore-side extending portion and the outside extending portion.

9. The tapered roller bearing according to claim 6, wherein:
a recessed portion or a projection portion extending axially is formed in the annular portion.

10. The tapered roller bearing according to claim 1, wherein:
the vaporization promotion mechanism is provided in a rotation-side bearing ring configured to rotate at the time of bearing rotation, the rotation-side bearing ring being the inner ring or the outer ring.

11. The tapered roller bearing according to claim 10, wherein:
a rotation number at the time of bearing rotation is 1000 rpm or more.

12. The tapered roller bearing according to claim 10, wherein:
the vaporization promotion mechanism is constituted by an axial recessed portion or a projection portion formed in a rib portion of the rotation-side bearing ring.

13. The tapered roller bearing according to claim 1, wherein:
a temperature of the liquid lubricant is at least a minimum temperature within a presumed temperature range of the liquid lubricant at the time of bearing rotation.

14. A power transmission device comprising:
the tapered roller bearing according to claim 1.

15. A tapered roller bearing, comprising:
an inner ring;
an outer ring spaced from an outer peripheral surface of the inner ring by an annular space, the outer ring and the inner ring being concentric about an axis;
a plurality of tapered rollers rollably disposed in the annular space; and
a cage retaining the plurality of tapered rollers, wherein:
liquid lubricant flows through the annular space,
a vaporization promotion mechanism is provided in a rotation-side bearing ring configured to rotate at a time of bearing rotation, the rotation-side bearing ring being the inner ring or the outer ring,
the vaporization promotion mechanism is configured as a recessed portion or a projection portion extending along the rotation-side bearing ring in a direction of the axis, and
the vaporization promotion mechanism is configured to decrease a pressure of the liquid lubricant at the time of bearing rotation so that a pressure of the liquid lubricant reaches a saturation vapor pressure at which the liquid lubricant changes from a liquid phase to a vapor phase.

* * * * *